US012795568B2

(12) United States Patent
Al-kadi et al.

(10) Patent No.: US 12,795,568 B2
(45) Date of Patent: Nov. 10, 2026

(54) SYNCHRONIZATION OF A MOBILE DEVICE AND A PEER DEVICE FOR UWB-BASED COMMUNICATION

(71) Applicant: NXP B.V., Eindhoven (NL)

(72) Inventors: Ghiath Al-kadi, Graz (AT); Stefan Lemsitzer, Stainz (AT); Christian Eisendle, Graz (AT)

(73) Assignee: NXP B.V., Eindhoven (NL)

( * ) Notice: Subject to any disclaimer, the term of this patent is extended or adjusted under 35 U.S.C. 154(b) by 717 days.

(21) Appl. No.: 18/303,979

(22) Filed: Apr. 20, 2023

(65) Prior Publication Data

US 2023/0354230 A1 Nov. 2, 2023

(30) Foreign Application Priority Data

May 2, 2022 (EP) .................................... 22171130

(51) Int. Cl.
*H04W 56/00* (2009.01)

(52) U.S. Cl.
CPC ............................... *H04W 56/0015* (2013.01)

(58) Field of Classification Search
CPC ........... H04W 56/0015; H04W 56/002; H04W 76/27; H04W 76/14; H04W 84/18; H04W 52/0219; H04W 52/0212; H04W 4/023; H04W 4/80; G01S 13/765; G16Y 30/00; G16Y 30/608; Y02D 30/70; H04L 23/02
See application file for complete search history.

(56) References Cited

U.S. PATENT DOCUMENTS 11,102,000 B2 * 8/2021 de Perthuis ......... H04L 63/0442
11,503,591 B2 * 11/2022 de Perthuis ....... H04W 72/0446
12,294,971 B2 * 5/2025 Ljung ....................... G01S 5/02
12,309,664 B2 * 5/2025 Micallef ............... H04W 4/029
2008/0233988 A1 * 9/2008 Yang ..................... H04W 56/00 455/515
2009/0080351 A1 * 3/2009 Ryu ...................... H04L 1/0003 370/312

(Continued)

FOREIGN PATENT DOCUMENTS

CN 113812190 A * 12/2021 ........ H04W 72/0453
CN 114128315 A * 3/2022 ............ H04B 1/719

(Continued)

OTHER PUBLICATIONS

Machine Translation of CN_114466446_A (Year: 2022).*

(Continued)

*Primary Examiner* — Sujoy K Kundu
*Assistant Examiner* — Vladislav Y Agureyev

(57) ABSTRACT

It is described a method of UWB-based communication between a mobile device and at least one peer device, the method includes, while the mobile device is in an idle mode, a synchronizing step including that the mobile device sending at least one synchronization message without performing a full Ranging cycle. The peer device receives the synchronization message; and the peer device synchronizes with the mobile device based on the received synchronization message. The method further includes, while the mobile device is in a non-idle mode, the mobile device starting a UWB-based DS-TWR session with the synchronized peer device in order to control the smart-device via the mobile device.

19 Claims, 4 Drawing Sheets

(56) References Cited

U.S. PATENT DOCUMENTS

| | | | | |
|---|---|---|---|---|
| 2010/0097973 | A1 * | 4/2010 | Wu | H04W 52/0254 370/312 |
| 2014/0056248 | A1 * | 2/2014 | Wang | H04L 1/1864 370/329 |
| 2014/0113654 | A1 * | 4/2014 | Rosay | H04W 24/10 455/456.1 |
| 2015/0189686 | A1 * | 7/2015 | Kasher | H04W 4/80 455/41.2 |
| 2015/0200811 | A1 * | 7/2015 | Kasslin | H04W 8/186 370/254 |
| 2016/0182175 | A1 * | 6/2016 | Landau | H04J 3/0658 370/514 |
| 2016/0205236 | A1 * | 7/2016 | Alameh | H04M 1/72454 455/566 |
| 2018/0175905 | A1 * | 6/2018 | Nabki | H04B 1/7183 |
| 2018/0213492 | A1 * | 7/2018 | Xia | H04B 1/7183 |
| 2018/0323922 | A1 * | 11/2018 | Lindoff | H04L 5/0048 |
| 2019/0208387 | A1 * | 7/2019 | Jiang | H04W 4/46 |
| 2019/0220728 | A1 * | 7/2019 | Lu | H05B 47/19 |
| 2020/0106877 | A1 * | 4/2020 | Ledvina | H04W 12/06 |
| 2020/0119766 | A1 * | 4/2020 | Nabki | H04B 1/719 |
| 2020/0150262 | A1 * | 5/2020 | Kim | H04W 76/40 |
| 2020/0182996 | A1 | 6/2020 | Lee et al. | |
| 2020/0204203 | A1 * | 6/2020 | de Perthuis | G07C 9/00309 |
| 2020/0228331 | A1 * | 7/2020 | de Perthuis | H04L 9/0872 |
| 2020/0265869 | A1 * | 8/2020 | Werner | H04R 1/08 |
| 2020/0287590 | A1 * | 9/2020 | Torborg | H04B 1/7183 |
| 2020/0294401 | A1 * | 9/2020 | Kerecsen | G08G 1/205 |
| 2020/0336303 | A1 * | 10/2020 | Sierra | H04L 63/1475 |
| 2021/0112548 | A1 * | 4/2021 | de Perthuis | G01S 13/765 |
| 2021/0337474 | A1 * | 10/2021 | Åström | H04W 52/0235 |
| 2021/0356550 | A1 * | 11/2021 | Lee | H01Q 1/526 |
| 2022/0070613 | A1 * | 3/2022 | Barton | G01S 5/0236 |
| 2022/0078609 | A1 * | 3/2022 | Appietto | H04L 9/0869 |
| 2022/0104166 | A1 * | 3/2022 | Schober | H04W 64/003 |
| 2022/0116071 | A1 * | 4/2022 | Hollar | H04W 56/0015 |
| 2022/0116902 | A1 * | 4/2022 | Liu | H04W 4/029 |
| 2022/0124865 | A1 * | 4/2022 | Kanamarlapudi | H04W 28/0226 |
| 2022/0167371 | A1 * | 5/2022 | Thangarasa | H04W 76/28 |
| 2022/0271793 | A1 * | 8/2022 | Tertinek | G01S 13/10 |
| 2022/0276365 | A1 * | 9/2022 | Yoon | H04L 9/0631 |
| 2022/0295430 | A1 * | 9/2022 | Schober | H04W 56/0055 |
| 2022/0345178 | A1 * | 10/2022 | Yoon | H04B 1/71632 |
| 2023/0016260 | A1 * | 1/2023 | Han | G01S 13/02 |
| 2023/0019120 | A1 * | 1/2023 | Koo | H04W 64/006 |
| 2023/0037601 | A1 * | 2/2023 | Lee | H04W 8/005 |
| 2023/0039932 | A1 * | 2/2023 | Booij | G01S 5/02585 |
| 2023/0052144 | A1 * | 2/2023 | Yang | H04W 64/00 |
| 2023/0062363 | A1 * | 3/2023 | Golshan | H04W 4/023 |
| 2023/0070483 | A1 * | 3/2023 | Ryan | H04W 56/009 |
| 2023/0105698 | A1 * | 4/2023 | Lowe | G01S 5/0273 342/451 |
| 2023/0108615 | A1 * | 4/2023 | Nam | G01S 5/0284 342/465 |
| 2023/0141919 | A1 * | 5/2023 | Jeon | G16Y 40/60 342/125 |
| 2023/0152468 | A1 * | 5/2023 | Fujisawa | G01S 7/4815 356/4.01 |
| 2023/0170933 | A1 * | 6/2023 | Lee | G01S 13/765 375/130 |
| 2023/0171723 | A1 * | 6/2023 | Krebs | H04L 69/28 370/329 |
| 2023/0171729 | A1 * | 6/2023 | Oh | H04W 56/002 455/456.1 |
| 2023/0276403 | A1 * | 8/2023 | Reddy | H04W 56/0015 455/456.1 |
| 2023/0315148 | A1 * | 10/2023 | Fang | G06F 1/3246 345/659 |
| 2023/0325807 | A1 * | 10/2023 | Suzuki | G06Q 20/3224 |
| 2023/0353365 | A1 * | 11/2023 | Chen | H04L 9/3226 |
| 2024/0147367 | A1 * | 5/2024 | Bauwens | H04W 52/0229 |
| 2024/0243833 | A1 * | 7/2024 | Wang | G01S 13/765 |
| 2024/0259764 | A1 * | 8/2024 | Barton | H04W 4/023 |
| 2025/0030510 | A1 * | 1/2025 | Xie | H04W 56/0015 |
| 2025/0088887 | A1 * | 3/2025 | Li | H04W 24/10 |
| 2025/0168808 | A1 * | 5/2025 | Ramachandran | H04W 24/10 |
| 2025/0184689 | A1 * | 6/2025 | Ramachandran | G01S 13/765 |

FOREIGN PATENT DOCUMENTS

| | | | | | |
|---|---|---|---|---|---|
| CN | 114430440 | A | * | 5/2022 | H04M 1/72457 |
| CN | 114466446 | A | * | 5/2022 | G01S 13/08 |
| CN | 115460688 | A | * | 12/2022 | H04W 4/80 |
| EP | 1906200 | A1 | * | 4/2008 | G01S 5/0218 |
| EP | 1832137 | B1 | * | 7/2013 | H04L 1/0026 |
| EP | 3670275 | A1 | * | 6/2020 | H04W 76/14 |
| EP | 1571785 | B1 | * | 12/2020 | H04W 60/04 |
| EP | 3826381 | A1 | | 5/2021 | |
| EP | 3919994 | A1 | * | 12/2021 | G05B 19/056 |
| EP | 3975631 | A1 | * | 3/2022 | H04W 56/001 |
| EP | 4047383 | A1 | * | 8/2022 | H04L 27/2626 |
| EP | 4057029 | A1 | * | 9/2022 | H04L 43/106 |
| EP | 4236506 | A1 | * | 8/2023 | H04W 64/00 |
| EP | 3864872 | B1 | * | 9/2025 | H04W 8/005 |
| KR | 20110051319 | A | * | 5/2011 | H04L 27/142 |
| KR | 20230011023 | A | * | 1/2023 | H04W 4/80 |
| KR | 20230049525 | A | * | 4/2023 | H04W 4/80 |
| WO | WO-2018197023 | A1 | * | 11/2018 | G16H 40/20 |
| WO | WO-2019067056 | A1 | * | 4/2019 | G01S 13/765 |
| WO | WO-2021049827 | A1 | * | 3/2021 | H01Q 21/30 |
| WO | WO-2021151967 | A1 | * | 8/2021 | G01S 7/4008 |
| WO | WO-2021179093 | A1 | * | 9/2021 | G08B 21/0272 |
| WO | WO-2021244331 | A1 | * | 12/2021 | H04W 4/33 |
| WO | WO-2022016971 | A1 | * | 1/2022 | H04W 64/00 |
| WO | WO-2022054574 | A1 | * | 3/2022 | H04W 84/10 |
| WO | WO-2022089216 | A1 | * | 5/2022 | G06F 1/1626 |

OTHER PUBLICATIONS

Car Connectivity Consortium Digital Key Release 3, Technical Specification Version 1.0.0 (CCC-TS-101); May 19, 2021.

FiRa "UWB Secure Ranging in FiRa" Aug. 2022.

Flueratoru, Laura et al.; "High-Accuracy Ranging and Localization with Ultra-wideband Communications for Energy-Constrained Devices"; IEEE Internet of Things Journal; arXiv:2104.11042v1; Apr. 22, 2021.

IEEE 802.15.4z-2020 "IEEE Standard for Low-Rate Wireless Networks—Amendment 1: Enhanced Ultra Wideband (UWB) Physical Layers (PHYs) and Associated Ranging Techniques;" in IEEE Std 802.15.4z-2020 (Amendment to IEEE Std 802.15.4-2020); Aug. 25, 2020; DOI: 10.1109/IEEESTD.2020.9179124.

* cited by examiner

SYNCHRONIZATION OF A MOBILE DEVICE AND A PEER DEVICE FOR UWB-BASED COMMUNICATION

CROSS-REFERENCE TO RELATED APPLICATIONS

This application claims priority under 35 U.S.C. § 119 to European Patent Application No. 22171130.2, filed on May 2, 2022, the contents of which are incorporated by reference herein.

TECHNICAL FIELD

The present technology relates to a method and a respective system of UWB-based communication between a mobile device and at least one peer device.

TECHNICAL BACKGROUND

Like bluetooth and Wifi, ultra-wideband (UWB) is a short-range, wireless communication protocol that operates through radio waves. UWB operates at very high frequency—a broad spectrum of Gigahertz frequencies—and can be used to capture highly accurate spatial and directional data. Using UWB it is possible to discover an object's location and communicate with it. When two UWB-enabled devices are near to one another, the devices start "ranging" including to calculate the time-of-flight between the devices, i.e. the round trip time of challenge/response communication packets. The UWB positioning process may instantaneously track the device movement in real-time. Furthermore, using angle-of-arrival (AOA) technology, the real-time accuracy of UWB measurements provides highly precise device location services at the centimeter level. Furthermore, UWB devices may also determine whether an object is stationary, moving closer or moving away. UWB can be used to have a mobile device, such as a smartphone, control an IoT device such as a household appliance or a multimedia system for example.

In a smart home eco system where UWB is used for connecting and controlling a smart device (e.g. IoT (Internet of Things)) by a smart device such as a phone, there are fundamental challenges that may make it very difficult to scale and provide a working system. One of the challenges is related to synchronizing the mobile device, such as a smartphone, with one or more smart devices (for example IoT devices) and keep the synchronization. Another challenge is how to make sure that the power consumption of the devices is kept low while the synchronization is maintained. A further challenge is how to control a specific device in an environment that has many devices next to each other.

OBJECT AND SUMMARY

Thus, there may a need for a method and a respective system of UWB-based communication between a mobile device and at least one smart device, wherein at least one of the aforementioned problems is reduced or even avoided.

This need may be satisfied by the subject-matter of the independent claims. The dependent claims specify particular embodiments of the present invention.

DESCRIPTION OF EXEMPLARY EMBODIMENTS

Embodiments of the present technology may provide a high scalable solution that may allow supporting high number of IoT devices in for example a home environment. Furthermore, embodiments may allow multiple peer devices, e.g. smart devices, such as smartphones, to connect to the full IoT devices in the UWB range. Embodiments may dynamically manage the ranging mode from the low power synchronization to full power ranging with data transfer within the same session. Further, embodiments of the present technology may enable the low power mode for the device that have limited power supply to participate to the network.

According to an embodiment it is provided a method of UWB-based communication between a mobile device, in particular hand carried device, and at least one peer device, the method comprising while the mobile device is in an idle mode: a synchronizing step including that the mobile device sends at least one synchronization message without performing full ranging cycle; the peer device receiving the synchronization message; and the peer device synchronizing with the mobile device based on the received synchronization message; the method comprising while the mobile device is in a non-idle mode: the mobile device starting a UWB-based ranging cycle, in particular DS-TWR session, with the synchronized peer device, in order to control the smart-device via the mobile device.

The mobile device may for example comprise or include a laptop computer, a tablet and/or a smartphone or general cellular phone. The peer device may comprise for example a home appliance or a multimedia device or any household device, for example set up in a home environment. The method may support simultaneously UWB-based communications between plural mobile devices and plural peer devices. For example, one mobile device may connect to between five and fifty peer devices. One peer device may for example connect to between one and ten mobile devices for example.

The idle mode may comprise that the mobile device is locked such that a user cannot immediately provide input to the mobile device. The mobile device may be needed to get unlocked, in order to allow the user to enter some input. The idle mode in particular may include that the display screen over which the user can also provide input, is off or is locked. When the mobile device is in the idle mode, the peer device cannot immediately be controlled by the user via the mobile device.

UWB-based communication requires a synchronization step between the mobile device and the peer device, in order to appropriately apply "ranging", in order to establish the distance and also angular positions of the two communicating devices. In a typical use case supported by embodiments, the mobile device which is UWB enabled points towards the UWB-enabled peer device, such as a home device, for example a speaker, a television, a light bulb or thermostat. The mobile device may then detect exactly what peer device is being pointed at and may then automatically open up a relevant control panel on the display of the mobile device, such as a smartphone display. The display of the mobile device may then be utilized by a user to turn on the peer device, such as to turn on the TV or turn it off, to select the colour and/or brightness of a smart light bulb, change the radio station, or adjust the volume of a speaker, turn up the thermostat or seamlessly cast video and audio from the mobile device to a television or speaker.

Embodiments may also be enable that the mobile device may pull up additional information from the peer device, such as song lyrics, further recommendations and other new ways of engagement. Embodiments may allow that the mobile device perceives signals from one or more peer devices in its surroundings and controls the peer devices when the mobile device points towards them. The mobile device as well as the peer device, such as a home device, may include a built-in UWB chip set and antennas, in order to support UWB technology or communication. Embodiments may support ranging methods of IEEE 802.15.8, e.g. SS-TWR, DS-TWR.

Double-sided two way ranging (DS-TWR) refers to a ranging method that uses two delays that naturally occur in signal transmission to determine the range between the two communicating devices. Thereby, the signal propagation delay between the two devices is considered as well as processing delay of acknowledgements within the respective devices. In DS-TWR there may be two types of messages, i.e. Poll, response, Final and report message which exchange between the two devices. The distance may then be estimated by the time-of-flight (ToF) between the two devices. The ranging cycle may alternatively comprise Single-sided two way ranging (SS-TWR).

The synchronizing step may include communication in the radio frequency range or optionally for example in a bluetooth frequency range. The synchronization step does not perform full Ranging cylce, since accurate determinations of the distance and also angle may not be required for synchronization. Thereby, power consumption may be reduced. The synchronization message may include information of the local time of the mobile device. The peer device may set its clock depending on the received synchronization message. Thereby, both devices, i.e. the mobile device and the peer device, are synchronized and may be kept synchronized over time which may for example involve that the mobile device continuous to send synchronization messages for example in a regular manner and the peer device receiving the respective synchronization messages and synchronizing based on the received synchronization messages over time.

The mobile device may then be set into a non-idle mode. The non-idle mode may for example include that an input screen is unlocked and thus is enabled to receive input from a user. The user may for example intend to control the peer device via the mobile device, for example to set a volume of an audio device or switch on a home appliance for example. For this purpose, a UWB-based DS-TWR session is started, thereby utilizing the synchronization which has been established previously. Since for synchronization, not the (full) DS-TWR session was applied or performed, both, the mobile device and also the peer device had reduced power consumption. The synchronization step may be preceded by a pre-synchronization step for example using bluetooth low energy communication technology. This will be described in an embodiment below.

The synchronization step may be accurate enough in order to synchronize the two devices for performing ranging using UWB-based communication.

According to an embodiment the synchronization step comprises transmitting subsequent UWB-based RCM messages from the mobile device to the peer device without transmitting any other messages in between, wherein the RCM messages include information that a standard ranging round should not be performed.

An RCM message is a ranging control message used during ranging. The RCM message is only one message of an entire set of messages which are exchanged in a multicast DS-TWR session. Usually, a standard ranging round is started by an RCM message. However, according to an embodiment the RCM message serving as a synchronization message includes the information that a standard ranging round should not be performed. This information is received by the peer device which therefore adapts its communication behaviour accordingly. For example, the peer device does not expect a poll message from the mobile device for example. Also the peer device does not send a response. Thereby, power consumption may be reduced.

According to an embodiment the subsequent RCM messages are transmitted at regular points in time, in order to keep the peer device synchronized with the mobile device.

The subsequent RCM messages enable the two devices to keep an accurate synchronization, even if the relative positioning of the mobile device and the peer device changes over time. The method may be performed while the distance between the mobile device and the peer device is within a permissible range, such as between 1 m and 10 m for example. Other values are possible.

According to an embodiment the method further comprises indicating at the mobile device and at the peer device that both devices are synchronized.

For example, at the mobile device and/or the peer device, a light, such as an LED light, may be illuminated or an indication may be given on a display screen of the respective device. A user may then recognize, that for example controlling the respective peer device is possible, for example by entering some input on an unlocked user screen.

According to an embodiment the mobile device enters a deep power saving mode, after the mobile device having transmitted the synchronization message, wherein the peer device enters a power saving mode, after the peer device having received the synchronization message.

When the mobile device and/or the peer device enter a power saving mode, power consumption may be reduced. The devices may have several power modes, such as an active mode, a deep power down (DPD) mode in which they consume microampere range current and a high power down mode, where they consume nanoampere current range for example.

According to an embodiment the peer device comprises an IoT device, wherein the mobile device comprises a smart phone. The IoT device may be any house appliance or home appliance, such as a TV, a radio, a washing machine, a light bulb, a lamp or any other device which is capable for UWB communication. The mobile device may also in other embodiments include a laptop or a tablet for example. Thereby, multiple different devices are supported by embodiments of the present technology.

According to an embodiment the idle mode of the mobile device comprises a user interaction screen being inactive. The idle mode may be released when the user presses a particular button. Then, the user interaction screen may be active, in order to enable the user to control the peer device via the mobile device.

According to an embodiment the DS-TWR session is started, while the mobile device is non-idle and the mobile device is pointing to the smart-device within a defined angle range and within a defined distance range.

During the DS-TWR session, the user may be enabled to control the peer device and/or to receive configuration or operating information from the peer device. Whether the peer device is within the defined angle range and/or the defined distance range may be determined by evaluating information obtained during the DS-TWR session including ranging information. Thereby, effective control of the peer device is enabled, while power consumption is reduced.

According to an embodiment Ranging cylce comprises: the mobile device transmitting at least one of: a RCM, a Poll-message, a Final-message, and a Final Data-message;

the peer device transmitting at least one of: a response after a poll-message by the mobile device, a report-message, a RCR-message, a RIUM-message. Thereby, the conventional DS-TWR communication is supported.

According to an embodiment the transmission is in a SP1-frame or SP0-frame, wherein at least one transmission frame is extended, in order to accompany application data. The SP0, SP1 frames specify particular data frames, for example related to the RCM message and/or the Poll-message or the response message. The application data may for example include.

According to an embodiment the method comprises for initial synchronization during the synchronization step: the peer device sending advertisement messages using bluetooth-based transmission; the mobile device receiving at least one of the advertisement messages and connecting to the peer device via a bluetooth-based protocol; and the mobile device establishing a bluetooth-based synchronization with the peer device.

The specified initial synchronization may also be referred to as a pre-synchronization step. Therein, a different technology, namely bluetooth, is utilized in order to enable a rough synchronization. The synchronization achievable by the bluetooth-based communication may be not as accurate as the synchronization as achieved by using the UWB-communication. However, a rough synchronization may be provided, enabling to quickly achieve an accurate synchronization via the UWB-based communication later on.

According to an embodiment the bluetooth-based protocol comprises a BLE-protocol, wherein the bluetooth-based synchronization between the mobile device and the peer device has a timing-error being less than 5 ms. The bluetooth low energy protocol may also contribute for saving power.

According to an embodiment the method further comprises at least one other the peer device receiving the synchronization message; and the at least one other peer device synchronizing with the mobile device based on the received synchronization message; the method comprising while the mobile device is in a non-idle mode: the mobile device starting a UWB-based (multicast) DS-TWR session with the synchronized at least one other peer device, in order to control the at least one other smart-device via the mobile device. Thereby, the mobile device may connect to two or more peer devices. Furthermore, later on, the mobile device may also control the two peer devices using UWB-based (multicast) DS-TWR.

According to an embodiment the method further comprises at least one other mobile device transmitting at least one other synchronization message without performing full Ranging cylce; at least one peer device receiving the other synchronization message; and the peer device synchronizing with the other mobile device based on the received other synchronization message; the method comprising while the other mobile device is in a non-idle mode: the other mobile device starting a UWB-based (multicast) DS-TWR session with the synchronized peer device, in order to control the smart-device via the other mobile device. Thereby, plural mobile devices may be connected to one peer device or even plural peer devices. Thereby, flexibility is improved.

It should be understood, that features, individually or in any combination, disclosed, described, explained or applied to a method of UWB-based communication between a mobile device and at least one peer device is also applicable, individually or in any combination, to a system of UWB-based communication according to an embodiment and vice versa.

According to an embodiment it is provided a system of UWB-based communication, comprising at least one mobile device; and at least one peer device, wherein the at least one mobile device and the at least one peer device are configured to carry out a method according to one of the preceding embodiments. The system may further comprise at least one other mobile device and at least one other peer device.

DETAILED DESCRIPTION OF THE DRAWINGS

Figure 1:
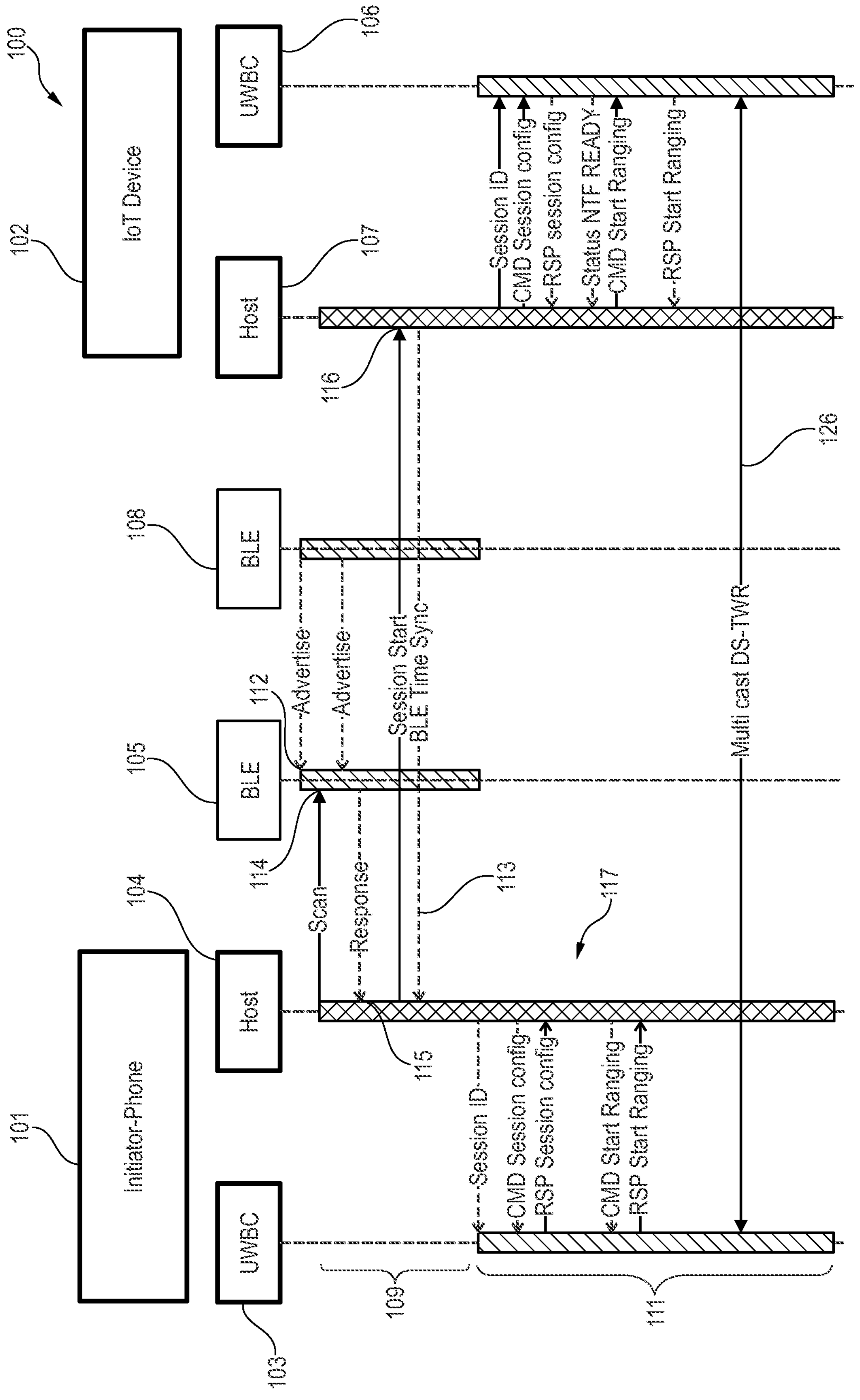
FIGS. 1 to 7 schematically illustrate particular embodiments of a system of UWB-based communication, according to embodiments, wherein the figures illustrate communication messages exchanged by the communication partners.

Embodiments of the present technology are now described referring to the figures. The invention is not restricted to the illustrated or described embodiments.

It should be understood that features or units in the different figures which are similar or same in structure and/or function are labelled with reference signs which differ only in the first digit. A description of one element or structure not described with reference to a particular figure may be taken from the respective description according to another embodiment or figure.

The system 100 of UWB-based communication according to an embodiment of the present technology comprises at least one mobile device 101 and at least one peer device, such as smart device 102 which are both UWB-enabled. The mobile device 101 comprises a UWB controller 103 as well as a host 104. The mobile device 101 further comprises a BLE unit 105 which is enabled to perform bluetooth low energy communications. The smart device 102 comprises a UWB controller 106 as well as a host 107 and a BLE unit 108.

In the embodiment illustrated in FIG. 1, the system 100 is configured to carry out a first phase 109 and a third and fourth phase 111. A second phase including a synchronization step is omitted in FIG. 1. During the first phase 109, an initial synchronization is performed using the BLE communication technology. Thereby, the smart device 102 sends using the BLE unit 108 advertisement messages 112 using bluetooth-based transmission. The mobile device 101 (in scan mode 114) receives at least one of the advertisement messages 112 and connects to the smart device 102 via a bluetooth-based protocol. Thereby, the mobile device 101 establishes a bluetooth-based synchronization with the smart device as indicated by the message 113.

In particular, the smart device 102 may permanently send advertisement messages 112 at the BLE-link. The mobile device 101 which receives one of the advertisement messages 112 will then connect to the smart device 102, since it may send scan messages 114. The advertisement messages 112 are received at the BLE unit 105 and transmitted in response messages 115 to the host unit 104. The host unit 104 then starts a session via the BLE layer 105 (see message 116).

During the third and fourth phase 111, the mobile device may initiate first and then start a multicast DS-TWR session, in particular as soon as a single smart device is found at a defined time interval. Therein, the third and fourth phase 111 comprises a portion 117 to exchange session ID, to configure and to range, before performing a multicast DS-TWR session 126.

The smart device 102 may continuously search for additional mobile devices which may allow for multiple users to connect to the same smart device 102.

Figure 2:
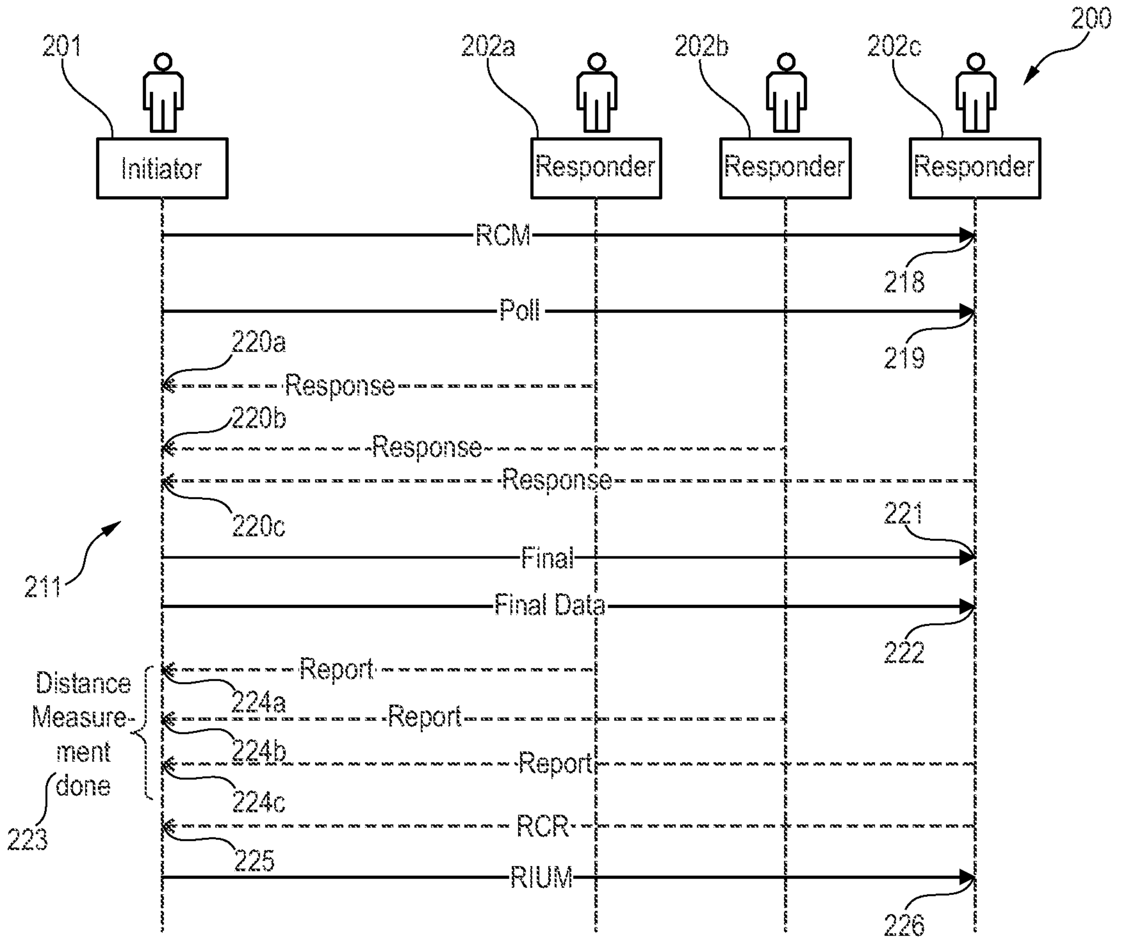

FIG. 2 schematically illustrates a system 200 according to another embodiment, in particular during a third and fourth phase 211 (and second phase 210) of a method of communication. A mobile device 201 is close to plural smart devices 202*a*, 202*b*, 202*c*. For synchronization, the mobile device 201 sends an RCM message 218. The synchronization or the RCM message 218 may be an example of a synchronization message sent or transmitted by the mobile device 201. Thus, the synchronization or the RCM message 218 may be transmitted during a second phase 210 providing a synchronization between the mobile device 201 and one of the smart devices 202*a, b, c*. In other embodiments, synchronization may be provided by the first phase 109 as depicted in FIG. 1.

The mobile device 201 may start multicast DS-TWR session, as soon as a single smart device is found at a defined time base. The block duration may be 1000 ms, the fixed slot alignment as aligned in the BLE establishment phase along with adding and removing devices may be applied. The smart device 202*a, b, c* may then synchronize on the multicast session. During the ranging cycle, in particular DS-TWR multicast, the RCM message 218 may be sent by the mobile device 201. Then, a Poll-message 219 may be sent by the mobile device 201. The smart device 202*a* may transmit a response message 220*a* which may be received by the mobile device 201. Other response messages 220*b*, 220*c* may be transmitted by the other smart devices 202*b*, 202*c*. The mobile device 201 may transmit a Final-message 221 to the smart device 202*c* and may then transmit a Final Data-message 222 to the smart device 202*c*.

During a reporting phase 223, the different smart devices 202*a*, 202*b*, 202*c* may transmit report messages 224*a, b, c* to the mobile device 201. Further, the smart device 202*c* may transmit a RCR-message 225 which is received at the mobile device 201. The mobile device 201 may transmit a RIUM-message 226, in particular including information how to control the respective smart device 202*c*.

Figure 3:
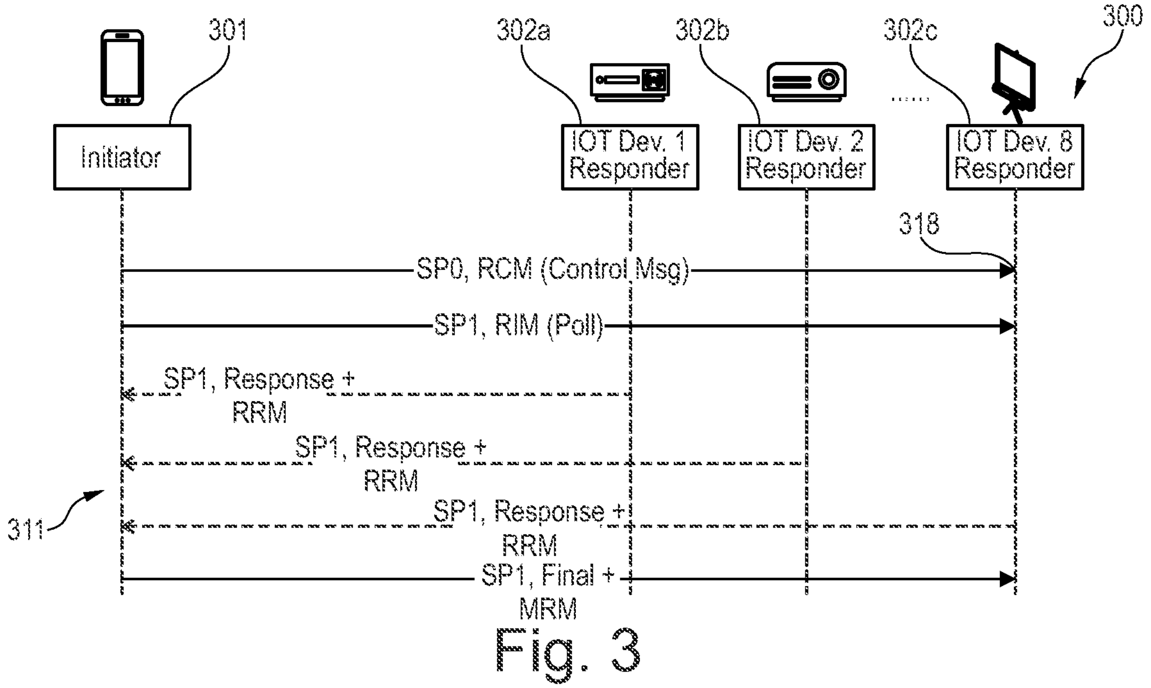

The system 300 schematically illustrated in FIG. 3 provides another embodiment during the third/fourth phase 311 including DS-TWR. Thereby, non-deferred multicast DS-TWR is also possible to achieve the same use case with less over the air communication. In particular, data may be added to the RRM and MRM air frames. When including remote control message, the MRM message might limit the possibility to add AoA back to the responder. Optionally, the controller device may indicate dedicated data transfer slot to the smart devices 302*a, b, c* that has been selected. Device selection may be done based on the AoA measurement during the responses. The data transfer slot may be allocated directly after the Final-message of the selected device.

Figure 4:
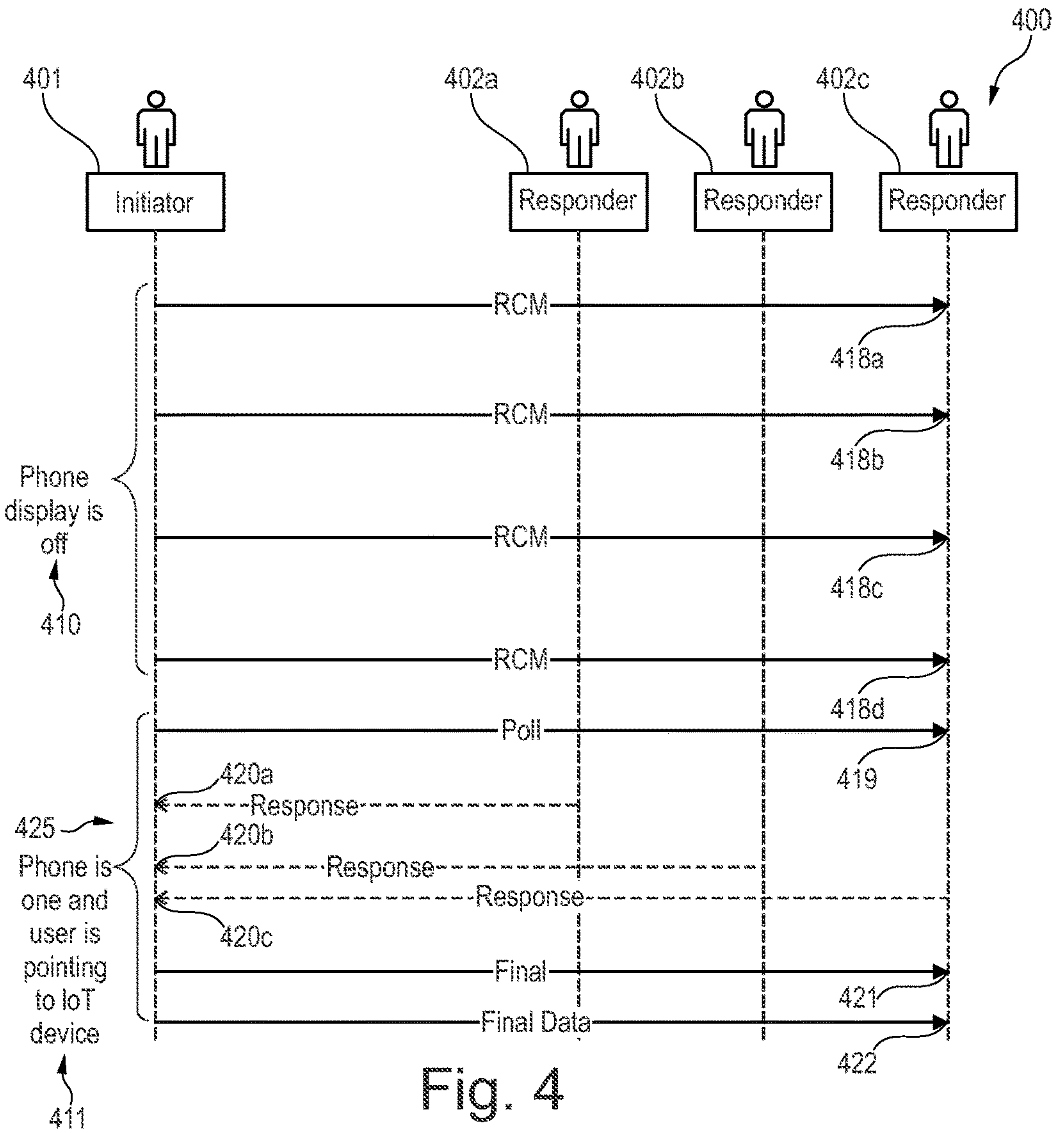

The system 400 schematically illustrated in FIG. 4 illustrates communication during the second phase 410 as well as during the third and fourth phase 411. The second phase comprises a synchronization step including that the mobile device 401 sends at least one synchronization message 418 which is here configured as an RCM message. The smart device 402*c* receives one of the plural RCM messages 418 and synchronizes with the mobile device 201 accordingly. The second phase 410 including the synchronization step may be performed while the mobile device is in an idle mode, in particular when the phone display is turned off, such that the user may not directly input any data for controlling the smart device 401*a, b, c*.

When the mobile device 401 is in a non-idle mode, i.e. in particular when the display of the mobile device 401 is turned on and also pointing to the particular smart device 402*c*, a UWB-based DS-TWR session may be established the third and fourth phase 411. The DS-TWR session includes sending a Poll-message 419 from the mobile device 401 to the smart device 402*c*. The smart device 402*c* responds with a response message 420*c*. Later on, the mobile device 401 transmits a Final-message 421 and then a Final Data-message 422 which is received by the smart device 402*c*.

In particular, when the mobile device 401 is in display off mode, the mobile device sends (during second phase 410) a blink (418) only instead of a full DS-TWR. The blink or synchronization message 418 may be the RCM message of the multicast DS-TWR with an indicator bit that the remaining of the ranging round shall not be processed.

Only when the mobile device is activated (i.e. the display is turned on), a full ranging session is started with the smart device 402 during the phases 411, i.e. the third/fourth phase.

Figure 5:
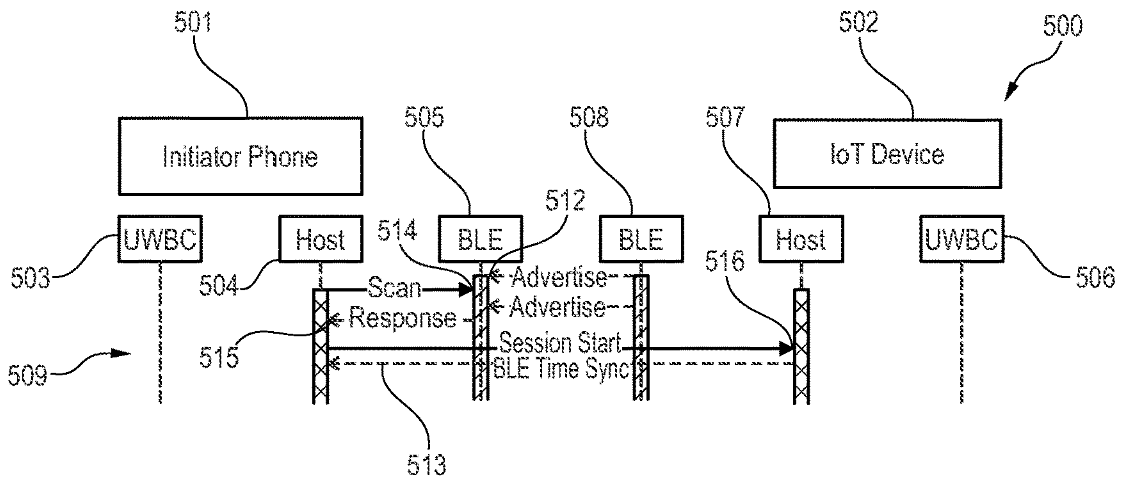

The system 500 schematically illustrated in FIG. 5 again illustrates communications during a first phase 509 which are similar to the communications as illustrated in FIG. 1 in phase 109. In particular, the smart device 502 may be set in an advertisement mode on the BLE layer, in particular when the boards are connected to the power supply. Thereby, the mobile device 501 is in the scan mode on the BLE layer. Once the devices 501, 502 are connected, they negotiate a common time base, for example with an accuracy smaller than 5 ms. After that, the first phase 509 is completed.

Figure 6:
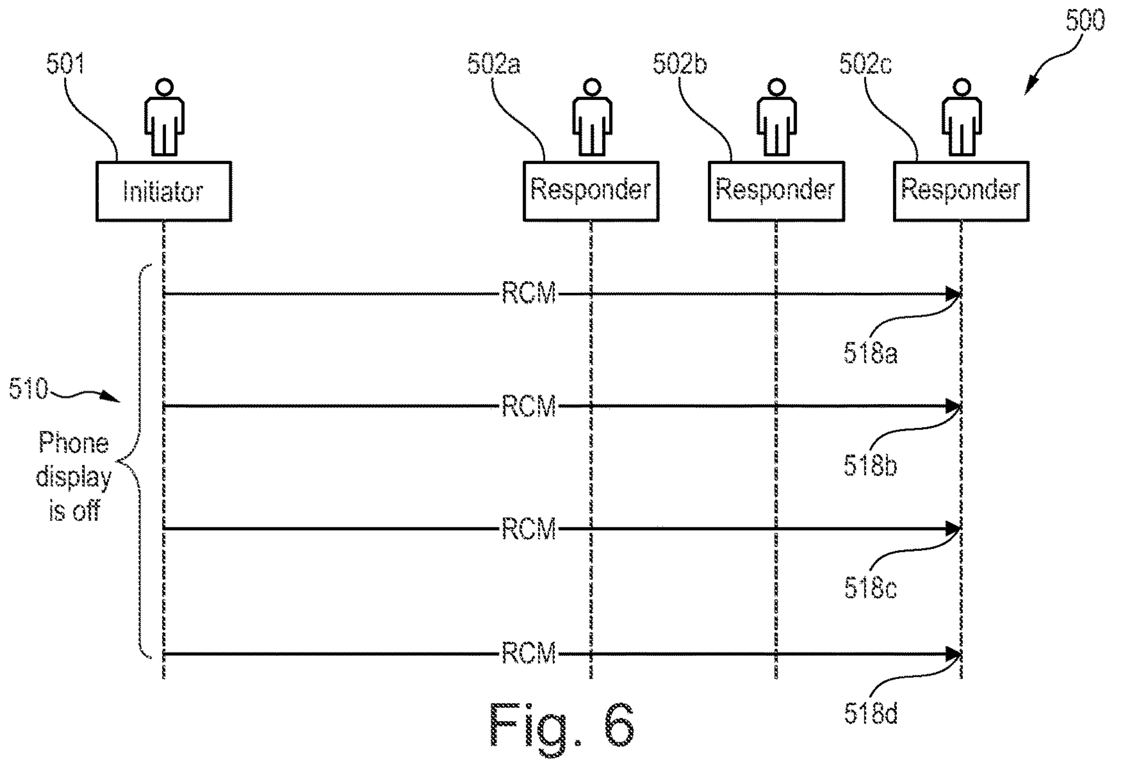

FIG. 6 schematically illustrates the system 500 in the second phase 510 which established a UWB-based time synchronization. In particular, the mobile device 501 transmits the UWB-based RCM message 518*a, b, c, d* for example in a regular time manner. Thereby, it is noted that the synchronization phase 510 does not perform a full DS-TWR multicast but merely sends subsequent RCM messages 518*a,b, c, d*. This second phase 510 may be performed while the mobile device 501 is in an idle mode, for example the display is turned off. Thereby, the mobile device sends a synchronization blink 518*a,b, c, d* for example each second. Whenever a blink is received by one of the smart devices, for example the smart device 502*c*, the "blue" LED is blinking on both devices to show that the devices still keep a synchronization on the UWB layer. After receiving/transmitting the blink (in particular the RCM messages 518*a,b, c, d*), both devices may enter the DPD mode again (power saving mode).

Figure 7:
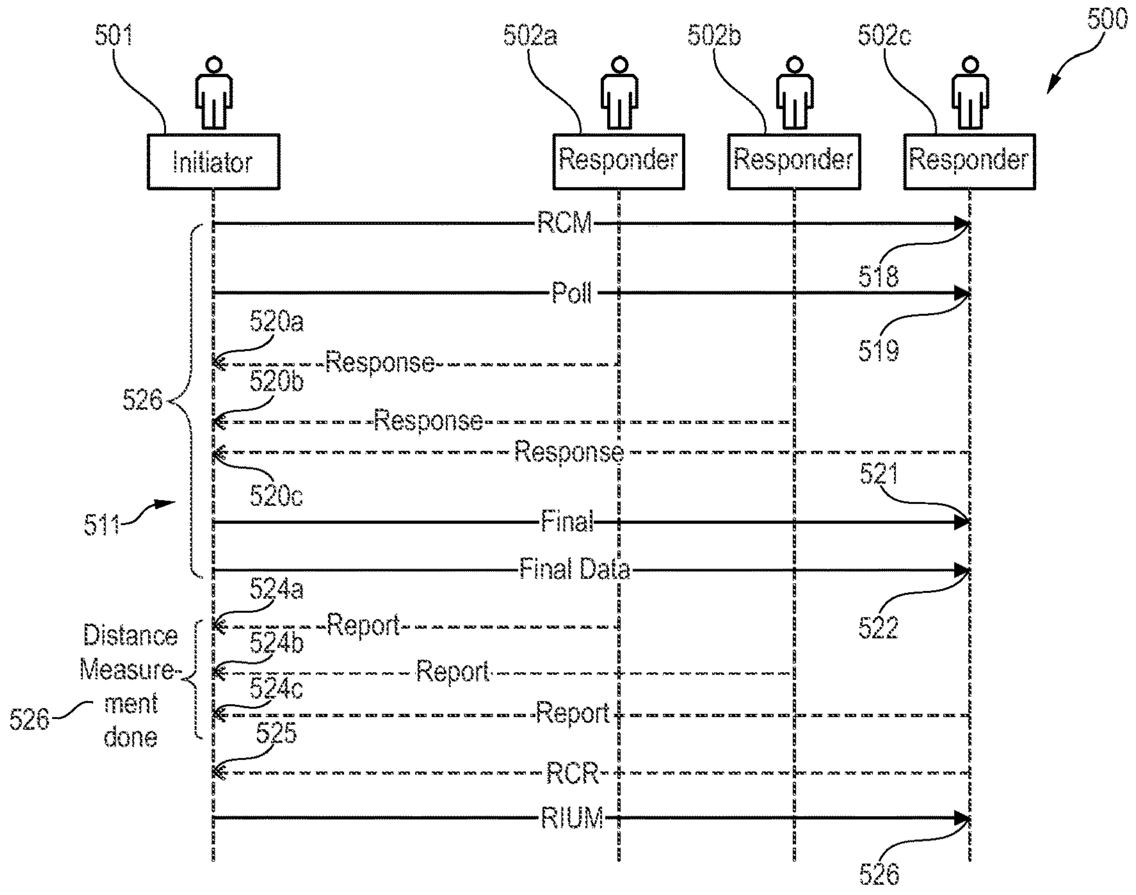

FIG. 7 illustrates the system 500 during the third/fourth phase where the mobile device starts an user interaction and a user presses for example a button. The third/fourth phase 511 comprises the third phase 525 and the fourth phase 526. The third phase 525 may be similar to the third phase 425 illustrated in FIG. 4. At the end of the third phase 525, ranging information is available, in particular the distance and the angle range in which the smart device 502*c* is arranged relative to the mobile device 501 is determined. During the fourth phase 426, control of the smart device 402*c* may be performed by the mobile device 411 and reporting information about the setting of the smart device 502*c* may be received by the mobile device 401. In the phases illustrated in FIG. 7, a fast reaction time (for example user feedback) is needed. The initiator is switching from the blink only to the full DS-TWR multicast ranging. Thus, the mobile device 501 performs full DS-TWR multicast in the third phase 525. Further, the block duration may be shortened to obtain a ranging periodicity of for example 200 ms.

In the phase as illustrated in FIG. 7 (in particular the fourth phase 526), the mobile device 501 is monitoring the AoA of all smart devices 502*a,b, c*. Thereby, the mobile device may wait for user input for a given smart device 502*a,b, c*. In case the user input is available, the subsequent ranging will biggy-pack this data to the destination smart device 502*a,b, c*. The user control command for the respective smart device 502*c* is implemented by the RIUM-message 526. After a predetermined time duration, for example 2 s, the phases 525, 526 may automatically be terminated and the mobile device 501 may again enter the display of mode.

During UWB data transfer, collision management may be managed based on adaptive hopping scheme. A session may be unique via its ID. Session parameters may include all required settings, such as PHY settings, MAC settings and the like. When the session is started, the controllee may start sending application date via dedicated data-packets. Data transfer and ranging sessions may be built up on top of the UWB communication scheme. Thereby, the UWB communication scheme is based on a strictly time multiplexed approach to optimize power consumption. The communication scheme is organized in blocks of typical size of 50-100 ms. Thereby, blocks are segmented into rounds. In a block, the actual rounds take place where UWB communication happens. Typically for a duration of 5-10 ms, the rounds themselves are segmented into slots. The round uses slots for example of 1 ms where the actual transmission is performed.

In this specification, embodiments have been presented in terms of a selected set of details. However, a person of ordinary skill in the art would understand that many other embodiments may be practiced which include a different selected set of these details. It is intended that the following claims cover all possible embodiments.

The invention claimed is:

1. A method of ultra-wideband (UWB)-based communication between a mobile device and at least one peer device, the method comprising:

performing a synchronization step including that the mobile device sends at least one synchronization message without performing a full ranging cycle, while the mobile device is in an idle mode, wherein, while in the idle mode, the mobile device is in a power-saving mode;

receiving, by the peer device, the synchronization message; and synchronizing the peer device with the mobile device based on the received synchronization message during the idle mode;

wherein while the mobile device is in a non-idle mode: starting, by the mobile device, a UWB-based ranging cycle with the synchronized peer device, in order to control the peer device via the mobile device.

2. The method according to claim 1, wherein the synchronization step comprises:

transmitting subsequent UWB-based synchronization control messages from the mobile device to the peer device without transmitting any other messages in between, wherein the UWB-based synchronization control messages include information that a standard ranging round should not be performed and wherein transmitting by at least one of the mobile device and the peer device is disabled during the power saving mode except when transmitting the synchronization message.

3. The method according to claim 2, wherein the subsequent synchronization control messages are transmitted at regular points in time in order to keep the peer device synchronized with the mobile device.

4. The method according to claim 2, wherein the ultra-wideband (UWB)-based synchronization control messages are ranging control message (RCM) messages.

5. The method according to claim 1, further comprising indicating at the mobile device and at the peer device that both devices are synchronized.

6. According to claim 1, wherein the mobile device enters a power saving mode after the mobile device transmits the synchronization message, and wherein the peer device enters a power saving mode after the peer device receives the synchronization message.

7. The method according to claim 1, wherein the peer device comprises an IoT device, and wherein the mobile device comprises a smart phone.

8. The method according to claim 1, wherein the idle mode of the mobile device comprises a user interaction screen being inactive.

9. The method according to claim 1, wherein the ranging cycle is started while the mobile device is non-idle and the mobile device is pointing to the peer device within a defined angle range and within a defined distance range.

10. The method according to claim 1, wherein the ranging cycle comprises at least one of:

the mobile device transmitting at least one of: a ranging control message (RCM), a Poll-message, a Final-message, and a Final Data-message;

the peer device transmitting at least one of: a response after a poll-message by the mobile device, a report-message, an RCR-message, a RIUM-message and wherein the ranging cycle comprises: a double-sided two-way ranging (DS-TWR) or a single-sided two-way ranging (SS-TWR).

11. According to claim 10, wherein at least one transmission frame is in one of a SP1-frame and a SP0-frame, wherein the at least one transmission frame is extended in order to accompany application data.

12. The method according to claim 1, further comprising, for initial synchronization during the synchronization step:

the peer device sending advertisement messages using a bluetooth-based transmission;

the mobile device receiving at least one of the advertisement messages and connecting to the peer device via a bluetooth-based protocol; and the mobile device establishing a bluetooth-based synchronization with the peer device.

13. The method according to claim 12, wherein the bluetooth-based protocol comprises a BLE-protocol, the bluetooth-based synchronization between the mobile device and the peer device allows for accurate time synchronization.

14. The method according to claim 13, wherein the bluetooth-based synchronization between the mobile device and the peer device allows for accurate time synchronization having a timing-error being less than 5 milliseconds.

15. The method according to claim 1, further comprising:

at least one other the peer device receiving the synchronization message; and the at least one other peer device synchronizing with the mobile device based on the received synchronization message, wherein while the mobile device is in a non-idle mode, the mobile device starting a ultra-wideband (UWB)-based double-sided two way ranging (DS-TWR) session with the synchronized at least one other peer device, in order to control the at least one other peer device via the mobile device.

16. The method according to claim 1, further comprising:

at least one other mobile device transmitting at least one other synchronization message without performing full ranging cycle;

at least one peer device receiving the other synchronization message; and the peer device synchronizing with the other mobile device based on the received other synchronization message, wherein while the other mobile device is in a non-idle mode, the other mobile device starting an ultra-wideband (UWB)-based double-sided two-way ranging (DS-TWR) session with the synchronized peer device, in order to control the peer device via the other mobile device.

17. The method according to claim 1, wherein the mobile device is a hand carried device and the peer device is a smart device.

18. The method according to claim 1, wherein the ultra-wideband (UWB)-based ranging cycle is a double-sided two-way ranging (DS-TWR) session.

19. A system of ultra-wideband (UWB)-based communication, comprising:

at least one mobile device; and at least one peer device, wherein a synchronizing step includes the at least one mobile device, while in an idle mode that includes a power saving mode, sending at least one synchronization message without performing full ranging cycle;

wherein the at least one peer device receives the synchronization message, wherein the peer device synchronizes with the mobile device based on the received synchronization message, and wherein while the at least one mobile device is in a non-idle mode, the at least one mobile device starts a UWB-based ranging cycle with the synchronized peer device in order to control the peer device via the mobile device.

* * * * *